United States Patent [19]

Carpenter et al.

[11] 3,941,333
[45] Mar. 2, 1976

[54] WEB CARTRIDGE

[75] Inventors: Ronald K. Carpenter, Los Angeles; Gusti L. Ives, Ontario, both of Calif.

[73] Assignee: Bell & Howell Company, Chicago, Ill.

[22] Filed: July 29, 1974

[21] Appl. No.: 492,800

[52] U.S. Cl. ............................... 242/197; 242/137.1
[51] Int. Cl.² ......................................... B65H 49/18
[58] Field of Search .......... 242/71.1, 71.8, 197–200, 242/195, 208, 137.1; 352/72, 78 R

[56] References Cited
UNITED STATES PATENTS

| | | | |
|---|---|---|---|
| 2,547,253 | 4/1951 | Bowers .............................. | 242/137.1 |
| 3,037,719 | 6/1962 | Bemmann .......................... | 242/71.1 |
| 3,334,831 | 8/1967 | Bradt ................................ | 242/208 |
| 3,468,491 | 9/1969 | Barry et al. ...................... | 242/71.1 |
| 3,620,475 | 11/1971 | Penn ................................. | 242/197 |
| 3,643,893 | 2/1972 | Neff .................................. | 242/195 |

*Primary Examiner*—Leonard D. Christian
*Attorney, Agent, or Firm*—Benoit Law Corporation

[57] ABSTRACT

A cartridge for a web comprises a casing having a first casing part for enclosing part of a web storage space. This first casing part has an access opening for the web storage space. The remainder of the web storage space is enclosed by a second casing part and by a door for the mentioned access opening. The second casing part is complementary to the first casing part whereby the first and second casing parts jointly enclose the web storage space. The first and second casing parts are mounted for movement relative to each other between two positions. The mentioned door is coupled to the second casing part for selectively closing the access opening upon relative movement of the first and second casing parts to one of the mentioned positions and for alternatively opening the access opening upon relative movement of the first and second casing parts to the other of the mentioned positions. A device is located in the web storage space for receiving a web in a wound condition.

A cartridge for a web comprises a casing enclosing a web storage space, a rotatable device in the web storage space for receiving a web in a wound condition, a brake member movably mounted in the web storage space, a device for biasing the brake member into braking relationship with the mentioned rotatable device, and a device for selectively releasing the brake member from the rotatable device.

21 Claims, 4 Drawing Figures

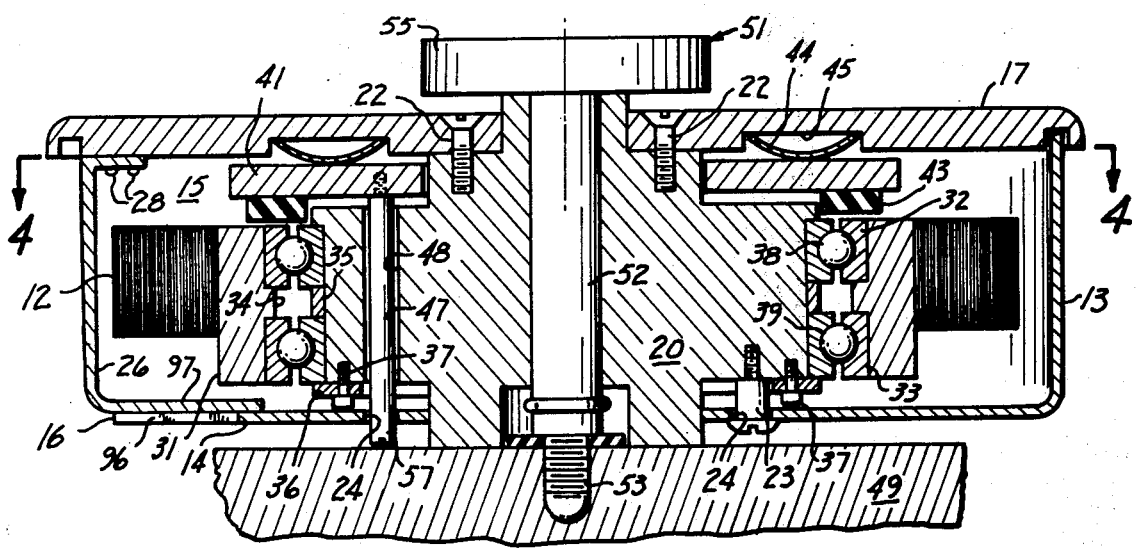

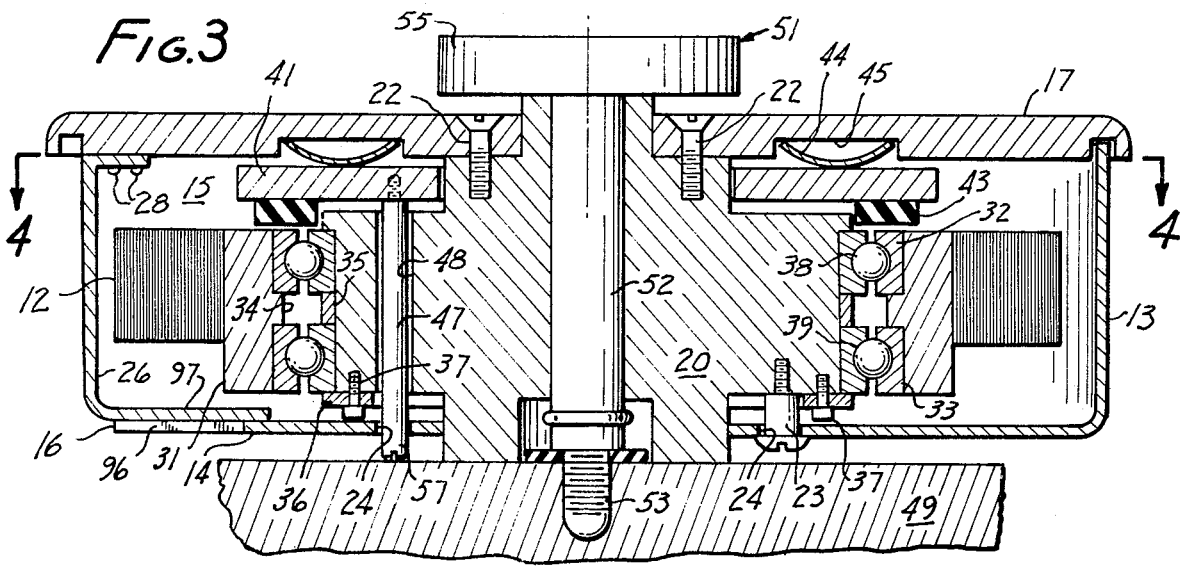
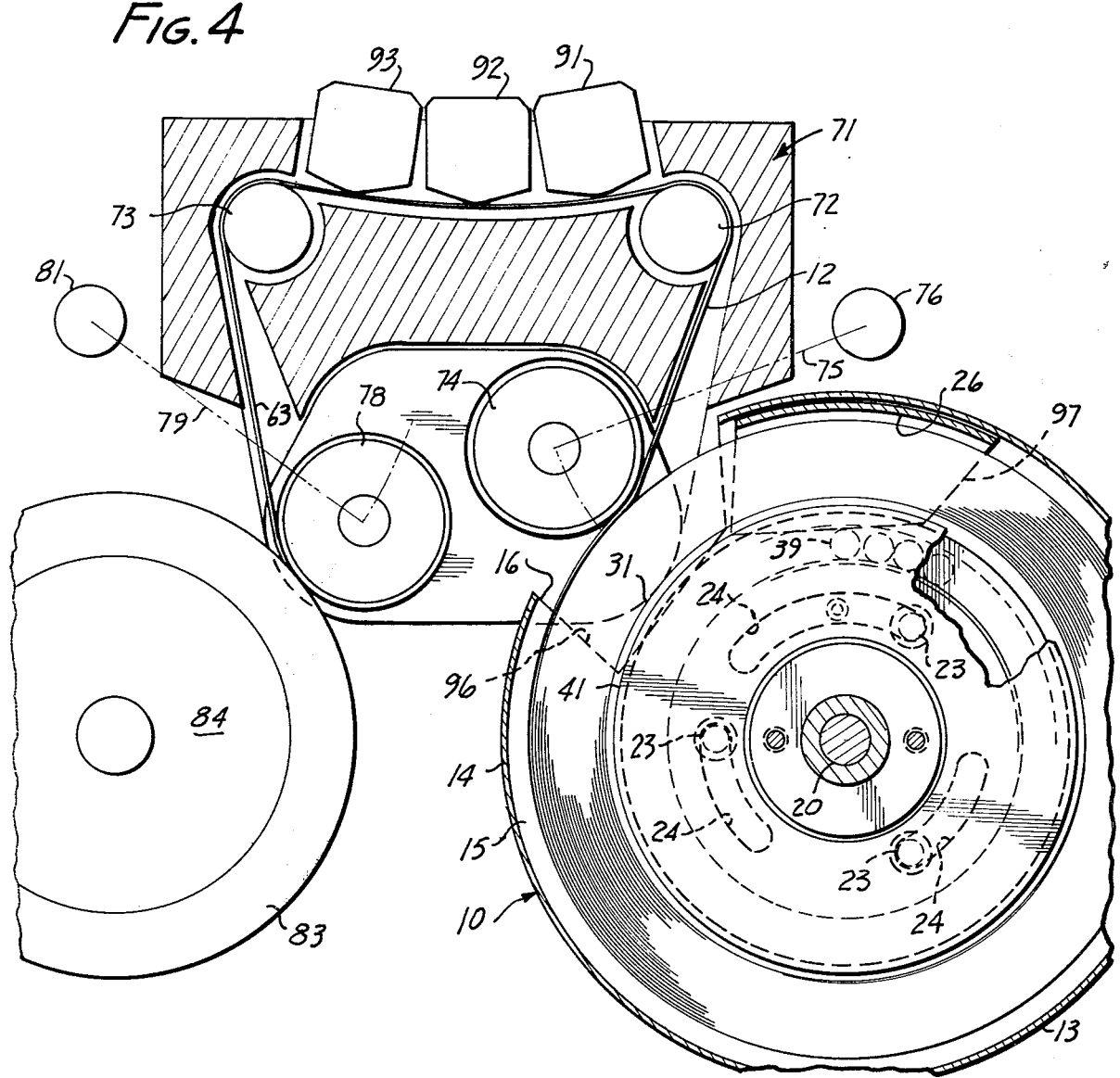

WEB CARTRIDGE

BACKGROUND OF THE INVENTION

1. Field of the Invention

The subject invention relates to web storage and handling equipment and, more particularly, to cartridges for webs, notably magnetic recording tapes or photographic films.

2. Description of the Prior Art

Web cartridges are well known in various fields of endeavor and include magnetic recording tape cartridges and motion picture film cartridges.

Despite a vast number of different existing or proposed web cartridge constructions, there persists a need for a web cartridge wherein an access opening to the web storage space is effectively and conveniently closed and opened at will, wherein a web leader or end portion is conveniently and securely retained in place when the web is not in use, and/or wherein the web retaining means are securely and automatically braked to avoid undesired unwinding of the web in the cartridge.

SUMMARY OF THE INVENTION

It is broadly an object of this invention to satisfy the above mentioned needs.

It is a related object of this invention to provide improved cartridges for a web, such as a magnetic recording tape or a photographic film.

It is also an object of this invention to provide a cartridge for a web wherein an access opening for a web storage space is conveniently opened and closed at will.

It is a related object of this invention to provide a cartridge for a web in which a web leader or web end is conveniently and securely retained in place when the web is not in use.

It is also an object of this invention to provide an improved cartridge for a web wherein web receiving or winding means are securely and automatically braked to inhibit undesired unwinding of the tape in the cartridge.

It is a related object of the invention to provide a web cartridge wherein web winding means are braked and a free end of the web is secured in place to prevent tape slack or loss of wrap during transit and storage.

Other objects of the invention will become apparent in the further course of this disclosure.

From a first aspect thereof, the subject invention resides in a cartridge for a web comprising in combination a casing having a first casing part for enclosing part of a web storage space, said first casing part having an access opening for said web storage space, means for enclosing the remainder of said web storage space, including a second casing part being complementary to said first casing part whereby said first and second casing parts jointly enclose said web storage space, means for mounting said first and second casing parts for movement relative to each other between two positions, said mounting means including a core, means for mounting one of said first and second casing parts on said core, and means for mounting the other of said first and second casing parts to said core for movement relative to said core, and a door coupled to said second casing part for selectively closing said access opening upon relative movement of said first and second casing parts to one of said positions and for alternatively opening said access opening upon relative movement of said first and second casing parts to the other of said positions, and means in said web storage space for receiving a web in a wound condition.

According to a preferred embodiment, the cartridge includes a brake member movably mounted in said web storage space, means for biasing said brake member into braking relationship with said web receiving means, and means for selectively releasing said brake member from said web receiving means.

BRIEF DESCRIPTION OF THE DRAWINGS

The subject invention and its objects will become more readily apparent from the following detailed description of preferred embodiments thereof, illustrated by way of example in the accompanying drawings, in which like reference numerals designate like or functionally equivalent parts and in which:

FIG. 3 is a diametrical section through the cartridge of FIGS. 1 and 2, and a section through an adjacent portion of a base; and FIG. 4 is a top view, taken along the line 4 — 4 in FIG. 3, of the illustrated web cartridge, together with adjacent parts of a web transport and utilization system.

DESCRIPTION OF PREFERRED EMBODIMENTS

Figure 1:
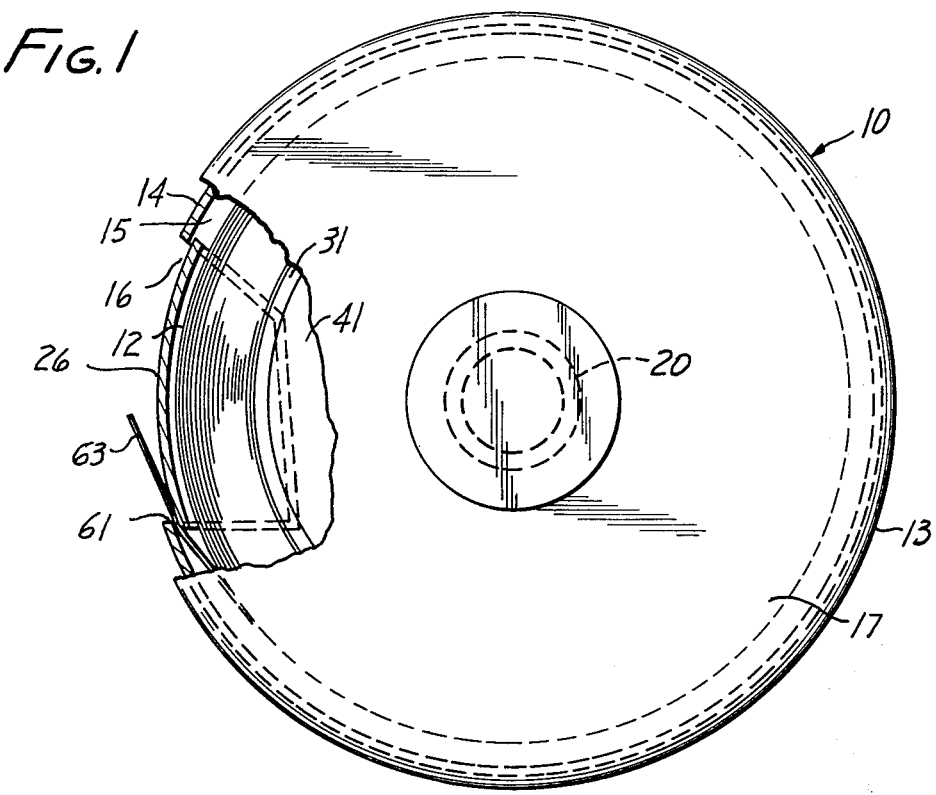
FIG. 1 is a top view of a web cartridge in accordance with a preferred embodiment of the subject invention, with parts broken away for better visibility.

The tape cartridge 10 of FIGS. 1 to 4 serves to take up, retain, and supply a web 12, such as a magnetic recording tape or a motion picture film. For convenience, the accompanying drawings are herein described in terms of magnetic recording tape, without any restrictive intention as to the kind or tape of web 12 that may be employed in the cartridge 10.

The illlustrated cartridge 10 has a casing 13 having a first casing part 14 for enclosing part of a web storage space 15.

The first casing part 14 has an access opening 16 for the web storage space. Means for enclosing the remainder of the web storage space 15 include a second casing part 17 being complementary to the first casing part 14 whereby the first and second casing parts jointly enclose the web storage space 15.

In the illustrated preferred embodiment, both the first and the second casing part 14 and 17 are similarly curved. In fact, the first casing part 14 has a hollow-cylindrical, pan-like configuration, and the second casing part has the form of a circular lid for the pan-like first casing part.

Means for mounting the first and second casing parts 14 and 15 for rotary movement relative to each other between a first position and a second position include a core 20 on which the first and second casing parts 14 and 17 are individually mounted.

In accordance with the illustrated preferred embodiment, the core 20 is of a generally cylindrical configuration.

Figure 2:
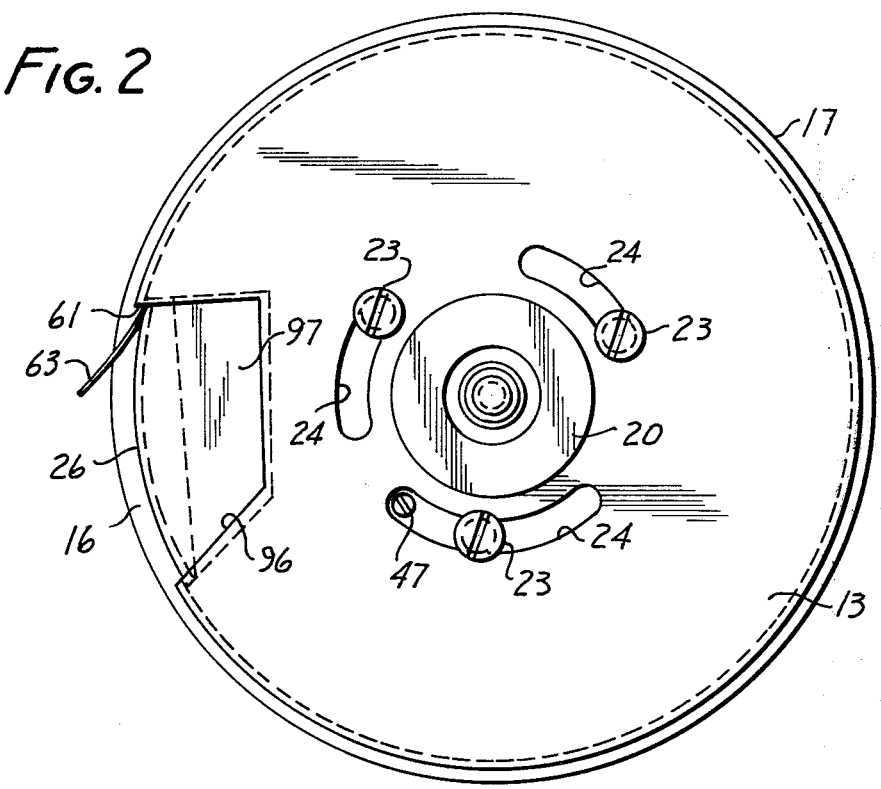
FIG. 2 is a bottom view of the cartridge of FIG. 1.

Also in accordance with a preferred embodiment of the subject invention, one of the casing parts 14 and 17 is affixed to the core, while the other of these casing parts is mounted on the core to be movable relative to the mentioned one casing part. In particular, the cartridge according to the illustrated preferred embodiment has the lid-shaped casing part 17 attached or affixed to the core 20 by screws 22. The pan-like casing part or shell 13, on the other hand, is mounted on the core 20 by shoulder screws 23. As best seen in FIG. 2, the casing part or shell 13 has curved slots 24, equal in number to the shoulder screws 23. The heads of the shoulder screws 23 retain the casing part 13, while the arcuate slots 24 permit relative rotary movement between the casing parts 14 and 17.

The above mentioned means for enclosing the remainder of the web storage space 15 further include a door 26 coupled to the second casing part 17 for selectively closing the access opening 16 upon relative movement of the first and second casing parts 14 and 17 to one of their relative positions as determined by the extent of at least one of the slots 24, and for alternatively opening or clearing the access opening 16 upon relative movement or rotation of the first and second casing parts 14 and 17 to the other relative angular position of the casing parts 14 and 17 as determined by the length of at least one of the slots 24.

Illustrating the latter feature, FIGS. 1 and 2 show how the door 26 closes the opening 16 when the relative angular position of the casing parts 14 and 17 is such that two of the shoulder screws 23 abut corresponding ends of the arcuate slots 24. FIG. 4, on the other hand, shows how the door 26 opens or clears the access opening 16 when the shoulder screws 23 abut corresponding opposite ends of the arcuate slots 24.

Those skilled in the art will recognize that there are many modes of, and devices for, coupling the door 26 to the second casing part 17 so that the door will selectively open and close the access opening 16 in response to or upon relative movement of the casing parts 14 and 17. In the illustrated preferred embodiment, the door 26 is shown attached to the casing part 17 by screws or rivets 28 shown in FIG. 3. In addition, the term "coupled to" as herein employed in connection with the door 26, is intended to be broad enough to cover also situations in which the door 26 is integral with the second casing part 17.

In accordance with the illustrated preferred embodiment of the subject invention, the access opening 16 in the first casing part 17 is dimensioned for the passage of the web 12 to and from the web storage space 15. It is, however, pointed out that the principles of the invention are also applicable to the selective closing and clearance of cartridge openings other than the web access opening just referred to.

For instance, the U.S. Pat. No. 3,334,831 by Gordon E. Bradt, entitled "Transport Systems for Limp Magnetic Tapes," and issued Aug. 8, 1967 to the subject assignee, discloses in addition to a web access opening also an auxiliary opening in a cartridge wall for enabling pressurized air to be injected into the cartridge to assist an automatic tape threading process.

The latter Bradt patent is herewith incorporated by reference herein and it is understood that the principles of the subject invention may be employed to provide selectively openable and closable web access and air injection openings in a cartridge usable in the Bradt system. In that case, there preferably would be separate doors, similar in function to the door 26 for closing and clearing the web access opening and the air injection opening.

As seen in FIG. 3, the cartridge 10 includes a sheaveless tape reel or web winding and retaining annulus 31 which extends around and is rotatably mounted on the core 20 by bearing means including two ball bearings 32 and 33 having their inner races situated on the core 20 and carrying with their outer races the reel 31 which has an angular shoulder portion 34 for that purpose. A spacer ring 35 and a retaining ring 36 cooperate in releasably maintaining the ball bearings 32 and 33 on the core 20. The retaining ring 36 is attached to the core 20 by screws 37. The ball bearings have balls 38 and 39.

The reel 31 receives and retains the web 12 in a wound condition. Since the reel 31 is of a sheave-less type, special precautions have to be taken to prevent tape slack and loss of wrap during transit and storage when the cartridge is not in use.

Accordingly, means are provided in the web storage space 15 for braking the web receiving means or reel 31. In particular, an annular brake member 31 is located inside the first and second casing parts 14 and 17. In particular, the annular brake member is located between the casing part 17 and the web reel 31. In order to preserve the integrity of the web casing 13, the brake member 41 is distinct from both casing parts 14 and 17 and is movable independently thereof.

The brake member 41 has a brake lining 43 which is preferably of an annular configuration and which may include or be made of a conventional brake lining material. A Belleville spring 44 or other biasing device is located in a groove 45 in the lower wall of the casing part 17 in order to bias the brake member 41 with brake lining 43 toward the reel 31 and ball bearing 32. In other words, the spring 44 biases the brake lining into braking relationship with the rotatable means or reel 31.

In order to permit normal operation of the web winding process, the illustrated cartridge includes means coupled to the braking member 41 for selectively releasing the brake lining 43 from the reel structure 31.

In particular, the cartridge includes at least one brake release member or pin 47 which extends through a bore 48 in the core 20 and through one of the slots 24 to the outside of the cartridge casing 13.

In practice, the cartridge 10 is mounted on a transport base 49 by means of a so-called cartridge reel hub locking member 51 having a bolt 52 extending through the core 20 and a threaded end 53 threaded into the base 49. The locking device 51 has a head 55 for retaining the core 20 securely on the base 49.

In that mounted position of the cartridge 10, the brake release pin 47 has its end portion 57 in engagement with the base 49 and is pushed into the bore 48 whereby the brake device and lining 43 is lifted off the reel 31. In that released position of the brake, the reel 31 can be freely rotated about the core 20 via the ball bearings 38 and 39.

On the other hand, when the locking device 51 is removed from the base 49, the cartridge 10 may also be removed, in which case the end portion 57 of the brake release pin is no longer pushed towards the cartridge 10. Accordingly, the spring 44 is now free to apply the brake lining 43 to the ball bearing 32 and reel 31, thereby arresting the motion of the web reel relative to the core 20.

Application of the brake lining 43 to the reel 31 would not necessarily prevent tape slack or loss of wrap during transit and storage, as long as the outer end of the stored web were free to move about. Accordingly, and as best seen in FIGS. 1 and 2, the door 26 and a portion 61 of the first casing part 14 adjacent the access opening 16 jointly constitute a means for retaining against removal a portion of the web 12 when the access opening 16 is closed by the door 26. In practice, this may be accomplished by placing the door 26 in close proximity to the first casing part 14. Also, both the door 26 and the access opening 16 with adjacent casing portions are similarly curved.

In practice, the portion of the web retained by the door 26 as just described may be a stiff leader 63. The expression "web" as herein employed is intended to be broad enough to cover not only the actual web itself, such as a magnetic recording tape or a photographic film, but also other web materials, such as a stiff leader which is frequently employed to facilitate automatic threading of the web during use thereof.

In practice, the cartridge 10 may be placed onto the base 49 with the core 20 standing on the base as illustrated in FIG. 3. The locking device 51 may then be applied and threaded into the base 49 as shown in FIG. 3 until the core 20 is locked on the base. The casing part or shell 13 is then manually rotated relative to the locked casing part or top 17, whereupon the access opening 16 is rotated away from the door 26 to the position shown in FIG. 4.

Leader 63 of the web 12 may then be threaded through a web transport block 71 and rollers 72 and 73.

A roller 74 is mounted on an arm symbolized by the phantom line 75 and pivoted at 76. Another roller 78 is mounted on an arm symbolized by the phantom line 79 and pivoted at 81. The roller 78 is biased by suitable spring means (not shown) against a wound web supply 83 on a further sheave-less wheel 84.

The roller 78, on the other hand, is biased by suitable spring means (not shown) against the wound supply of web 12 on the reel 31. The rollers 74 and 78 insure a tight wrap of the web on the reels 31 and 84.

In practice, either of the rollers 72 and 73 may act as a capstan for advancing the web 12 past a series of devices, such as magnetic reading, erasing and recording heads 91 to 93, in the case of a magnetic recording tape.

After the web 12 has been unwound from the reel 31 to the extent desired, the drive may be reversed to rewind the unwound web onto the reel 31 until the stiff leader 63 is located in the access opening 16. At that juncture, the casing part or shell 13 may be rotated relative to the core 20 and fixed casing top 17 until the access opening 16 is moved over the door 26. In that case, the stiff leader 63 is pinched in between the door 26 and the adjacent portion 61 of the casing cell 13 as shown in FIGS. 1 and 2.

In the illustrated preferred embodiment, the rollers 74 and 78 are driven by conventional means (not shown) to drive the tape reels 31 and 84. However, it is to be understood that other conventional means may be employed for driving the tape or web reels.

In order to permit the roller 47 to follow the diminishing thickness of the web supply into the cartridge, the access opening 16 has a portion 96 which cuts into the bottom of the shell 13 and which is selectively closed by a corresponding portion or lobe 97 of the door 26.

While not limited to any particular use, the cartridge of the subject invention is particularly suitable for use in automatic web threading apparatus, such as those disclosed in U.S. Pat. No. 3,643,893, by Joseph J. Neff, entitled "Web-Threading Apparatus" issued Feb. 22, 1972, to the subject assignee.

The subject extensive disclosure will render apparent or suggest various modifications and variations within the spirit and scope of the subject invention to those skilled in the art.

We claim:
1. A cartridge for a web, comprising in combination:
   a casing having a first casing part for enclosing part of a web storage space, said first casing part having an access opening for said web storage space;
   means for enclosing the remainder of said web storage space, including a second casing part being complementary to said first casing part whereby said first and second casing parts jointly enclose said web storage space, means for mounting said first and second casing parts for movement relative to each other between two positions, said mounting means including a core, means for mounting one of said first and second casing parts on said core, and means for mounting the other of said first and second casing parts to said core for movement relative to said core, and a door coupled to said second casing part for selectively closing said access opening upon relative movement of said first and second casing parts to one of said positions and for alternatively opening said access opening upon relative movement of said first and second casing parts to the other of said positions; and
   means in said web storage space for receiving a web in a wound condition.
2. A cartridge as claimed in claim 1, wherein:
   said access opening in said first casing part is dimensioned for the passage of said web to and from said web storage space.
3. A cartridge as claimed in claim 2, wherein:
   said door and a portion of said first casing part adjacent said access opening jointly constitute means for retaining against removal a portion of said web when said access opening is closed by said door.
4. A cartridge as claimed in claim 1, wherein:
   said mounting means include means for mounting said casing parts for rotary movement relative to each other between two angular positions; and
   said door is coupled to said second casing part for selectively closing said access opening upon relative rotary movement of said first and second casing parts to one of said angular positions and for alternatively opening said access opening upon relative rotary movement of said first and second casing parts to the other of said angular positions.
5. A cartridge as claimed in claim 4, wherein:
   said door is curved.
6. A cartridge as claimed in claim 4, wherein:
   said door and said access opening are similarly curved.
7. A cartridge as claimed in claim 4, wherein:
   said first casing part is curved.
8. A cartridge as claimed in claim 4, wherein:
   said first and second casing parts are similarly curved.
9. A cartridge as claimed in claim 1, wherein:
   said first casing part has a pan-like configuration; and
   said second casing part has the form of a lid for said pan-like first casing part.
10. A cartridge as claimed in claim 1, wherein:
    said first casing part is cylindrical;
    said second casing part is circular; and
    said mounting means include means for mounting said casing parts for rotary movement relative to each other between said two positions.
11. A cartridge as claimed in claim 1, wherein:

said web receiving means include bearing means on said core and annular web supporting means on said bearing means and around said core.

12. A cartridge as claimed in claaim 1, wherein:
said door is attached to said second casing part.

13. A cartridge as claimed in claim 1, including:
means in said web storage space for braking said web receiving means; and
means coupled to said braking means for selectively releasing said braking means.

14. A cartridge as claimed in claim 1, wherein:
said web receiving means include rotatable means in said web storage space for receiving and retaining a web in a wound condition;
said cartridge includes means including a brake member distinct from and located inside said first and second casing parts for selectively braking said rotatable web receiving and retaining means; and
said door and a portion of said first casing part adjacent said opening jointly constitutes means for retaining against removal a portion of said web when said access opening is closed by said door.

15. A cartridge as claimed in claim 1, including:
a brake member movably mounted in said web storage space;
means for biasing said brake member into braking relationship with said web receiving means; and
means for selectively releasing said brake member from said web receiving means.

16. A cartridge as claimed in claim 15, wherein:
said brake member is located between said web receiving means and a wall of said casing.

17. A cartridge as claimed in claim 16, wherein:
said biasing means are located between said wall of said casing and said brake member.

18. A cartridge as claimed in claim 16, wherein:
said brake releasing means have a release member extending through said casing at a location opposite said wall.

19. A cartridge as claimed in claim 16, wherein:
said casing has a web access opening;
said cartridge includes a door structure for selectively closing said access opening and for retaining against removal a portion of said web when said access opening is closed by said door.

20. A cartridge as claimed in claim 19, wherein:
said casing includes two complementary casing parts and means for mounting said complementary casing parts for movement relative to each other;
said web access opening is located in one of said casing parts; and
said door is coupled to the other of said casing parts for actuation of said door in response to relative movement of said complementary casing parts.

21. A cartridge as claimed in claim 20, wherein:
said door is attached to said other casing part.

* * * * *